Jan. 3, 1967    E. FISHER    3,295,229
MATHEMATICAL TEACHING DEVICE
Filed July 24, 1964    2 Sheets-Sheet 1

INVENTOR.
EMERY FISHER
BY
ATTORNEY

Jan. 3, 1967  E. FISHER  3,295,229
MATHEMATICAL TEACHING DEVICE
Filed July 24, 1964  2 Sheets-Sheet 2
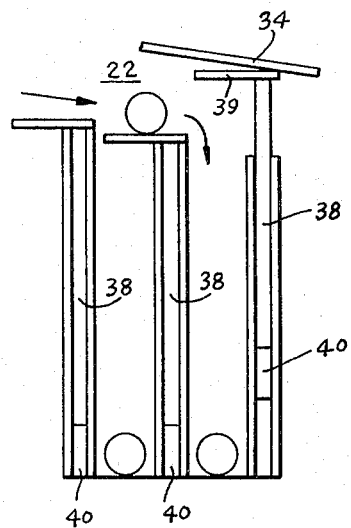
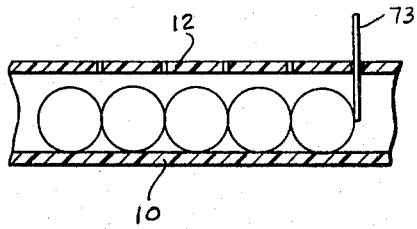
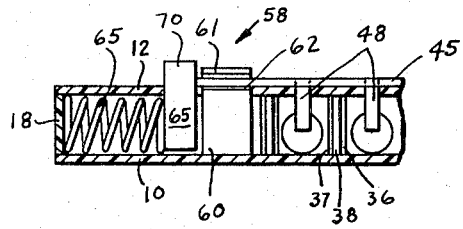
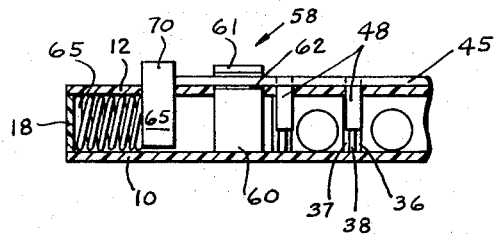
INVENTOR.
EMERY FISHER
BY
ATTORNEY

United States Patent Office 3,295,229
Patented Jan. 3, 1967

3,295,229
MATHEMATICAL TEACHING DEVICE
Emery Fisher, 645 Arnow Ave., Bronx, N.Y. 10467
Filed July 24, 1964, Ser. No. 384,857
5 Claims. (Cl. 35—31)

The invention relates generally to teaching devices and more particularly to a device for teaching mathematics.

It is an object of the present invention to provide a novel device for teaching mathematics.

It is another object of the invention to provide a novel teaching device with which a person may teach himself the basic arithmetic operations of addition, subtraction, multiplication and division.

It is another object of the present invention to provide a novel teaching device which has the appearance of a toy and is fun to operate. Because of its game aspect, children will play with the device and thereby painlessly learn arithmetic.

According to the invention there is provided a device comprising a plurality of balls, a first passage one end of which is adapted to receive a ball, an operator operative trigger mechanism located at said one end of the first passage for projecting a ball through the passage, a plurality of storage passages located at the other end of the first passage for selectively receiving the balls emerging from the first passage, a gate interconnected with the storage passages for retaining the balls in the storage passages, and said gate being operator operative to release said balls from the storage passages, a second passage connected at one end to receive the released balls from the storage passage and at the other end to said one end of the storage passage, said second passage holding the balls in a single line visible by the operator, numbers visible to the operator positioned in consecutive order on said second passage in correspondence with the lined up ball positions in said second passage, and at least one peg to be operated by the operator, capable of being inserted into the second passage at any numbered location for blocking the balls from passing that location.

The invention will be better understood and additional objects and advantages of the invention will become apparent from the following description taken in connection with the accompanying drawing, which, illustrate a preferred form of the device. It is to be understood, however, that the invention may take other forms, and that all such modifications and variations, within the scope of the appended claims, which will occur to persons skilled in the art are included in the invention.

In the drawing:

FIG. 2 is a detailed front elevation of three of the storage channels, showing one channel in the open position.

FIGS. 3A and 3B are elevations taken through line 3—3 of FIG. 1 showing part of the locking member in closed and open position.

FIG. 4 is a side elevation taken through line 4—4 of FIG. 1 and shows in detail a blocking peg in operative relation with the balls in the trough.

Figure 1:
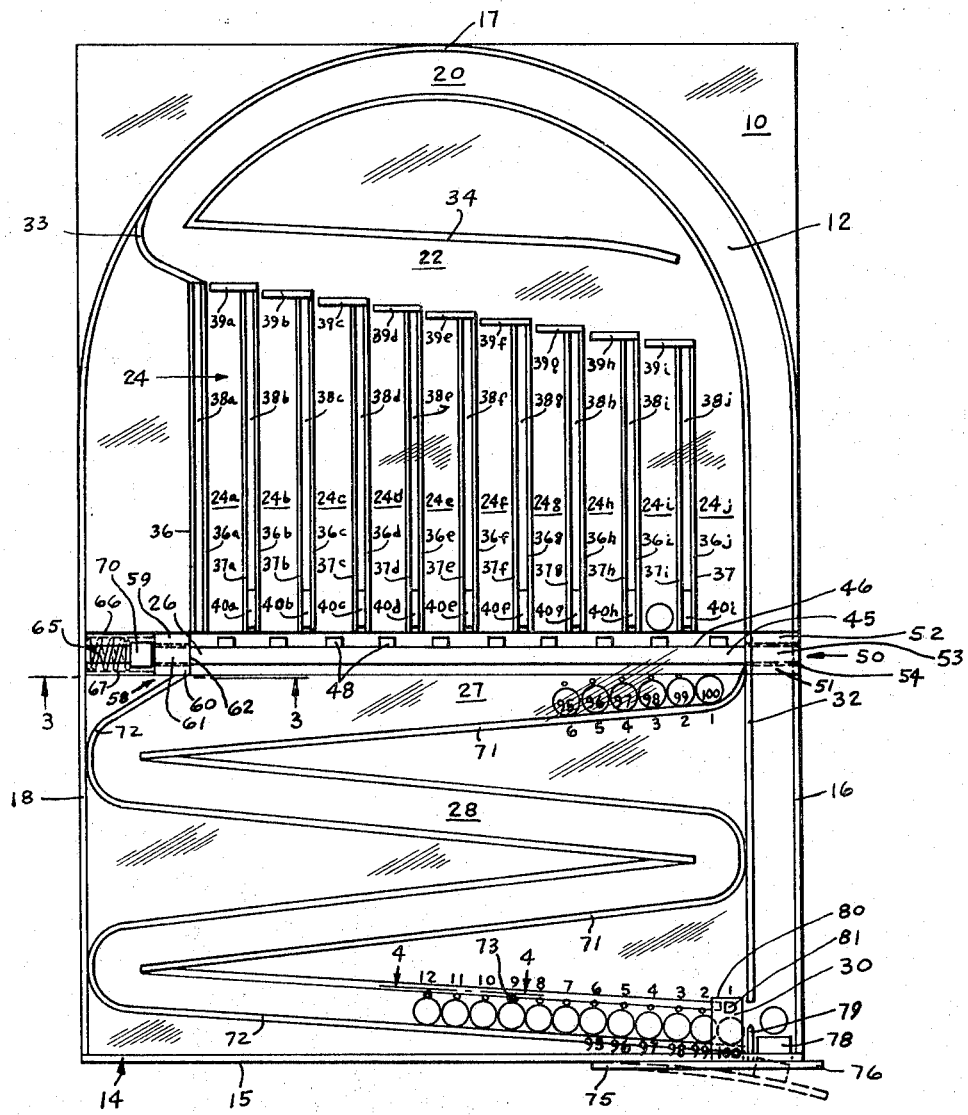
FIG. 1 is a front elevation of a device constructed in accordance with the invention.

Referring now to FIG. 1 as a whole, the exterior of the device is shown having a rectangular back plate 10; and a front plate 12 parallel with the back plate, curved at one end, and made of a transparent material. A wall 14 extending downward from the periphery of the front plate 12 and joins the two plates together. The wall 14 has a bottom 15, a right side 16, a top 17 which is curved, and a left side 18. The interior of the device includes generally a first passage 20 extending from the lower right corner up the right side across the curved top to the upper left side where it opens into a distribution area 22 above a plurality of longitudinal storage passages 24, which extend downward towards the middle section of the device. A gate 26, extends transversely across the device below the storage passages 24 and separates the storage passages 24 from an upper open portion or collection area 27 of an undulatory passage 28 that extends continuously from side to side and downwards to terminate at the lower right hand corner of the device, in a combination stop and trigger mechanism 30. The passages are filled with 100 balls which are free to roll therein between stops and which will be described below. When the device is in use its top is propped and the balls roll towards the bottom unless blocked by one of the stops.

Referring now to FIG. 1 in detail, it will be seen that the first passage 20 is defined by the right and top portion 16 and 17 of the external wall 14, and a J-shaped wall 32 located inward from said right and top sides of wall 14. A curved guide wall 33 extends inward and downward from the top wall 17 at the end of the passage 20, to guide a ball emerging from the passage into the distribution area 22. A guard wall 34 slopes downward to the right from the upper end of the J-shaped wall 32 to the knee of said wall and defines the upper limit of the distribution area 22.

Located below the distribution area 22 are ten storage passages designated generally by the legend 24, and individually by the post-scripted notation 24a through 24j. Each of the passages 24a–24j is defined by a left wall 36 and a right wall 37. An individual wall 36a–36j and 37a–37i is provided for the left and right sides respectively of each passage 24a–24j except the right side of the right most storage passage 24i which is delineated on its right side by the left side of a portion of the J-shaped wall 32. The passages 24 are of decreasing height beginning with the first or left most passage 24a, and each pair of walls between adjacent passages is slightly shorter than the pair of walls between the passage immediately to their left. The purpose of having the top of each passage shorter than their left neighbor, is that the tops of these passages form the bottom of the distribution area 22 which slopes downward to the right.

Nine spaces are provided between the adjacent walls of adjacent passages; (i.e. in between the right wall 37a of the first passage 24a, and the left wall 36b of the second passage 24b, in between walls 37b and 36c and 36d, etc. . . . to the space in between wall 37i and wall 36j). In each of these nine spaces there is slidably mounted a shaft 38. The upper end of each shaft 38b–38j terminates in a flange 39a–39i which extends leftward over the top of the storage passage which is adjacent on its left (i.e., that passage which bears the corresponding letter postscript). The lower end of each shaft 38b–38j is provided with a handle 40a–40i which protrudes upward through the front plate 12 to be gripped by the student or person operating the device for sliding the shaft 38 upward or downward.

In FIG. 1 all of the shafts 38 are shown in down position. FIG. 2 shows a detail of one shaft 38 in the up position; the flange 39 touches the guard wall 34 and the upper end of the shaft 38 divides the distribution area 22. A ball entering the distribution area 22 from the first passage rolls on top of the flanges of the closed shafts in the distribution area until it collides with the wall of a shaft which is in the up position. The ball then falls into this storage passage to the left of the up shaft. If none of the nine shafts 38 are up, the ball will roll all the way to the right end of the distribution area and into the last or right most passage 24j.

The lower ends of the storage passages 24 are blocked (FIG. 1) by a gate 26, which separates the passage 24 from the collection area 27 and the undulatory passage 28. The left hand section of the gate 26 is shown in side elevation in FIGS. 3A and 3B. In FIG. 3B the gate is open, in FIG. 3A, as in FIG. 1, the gate is closed.

The gate 26 includes a slat 45, whose inner edge is flush with the under-side of the front plate 12, and whose outer edge protrudes slightly above the outer surface of said plate. The top edge 46 of the slat 45 is provided with ten fingers or stops 48, which extend inwardly toward the back plate 10. The fingers 48 are positioned along the slat, and when the gate is closed, each finger is aligned with the center of a storage passage 24 and blocks the bottom exit of the passage. The slat 45 may be slid leftward from the closed position, and the stops 48 are thus shifted to a position below the walls 36, 37 and 38 (as shown in FIG. 3) where they no longer block the exits of the passages 24, and any balls in these passages 24 will roll downward into the area 27.

The right end of the slat 45 extends over the first passage 20 and is mounted in a guideway 50. The guideway has two transverse spaced apart walls 51 and 52 attached to the front edge of the J-shaped wall 32 and front edge of the right portion 16 of the wall 14. A plate 53 is attached on the front edges of the walls 51 and 52, and another plate 54 is attached to the right edges of the walls 51 and 52, and the right edge of the plate 52. The under surface of the plate 54, the central surfaces of walls 51 and 52 and the upper edges of walls 16 and 32 form a guideway in which the right end of the slat 45 slides. The side plate 54 acts as a stop and defines the right most limit of travel of the slat 45. The right most back edge of the slat 45 is preferably rounded so it will slide smoothly over the edge of the wall 16 and the right end of the slat will come up against plate 54, rather than have the bottom corner of the right end of slat 45 be stopped by the left side of wall 16.

The left end of slat 45, is also mounted in a slideway 58 which is located below and just to the left of the channels 24. The slideway 58 has a pair of spaced apart walls 59, 60 mounted on the back plate extending frontward past the plane of the front plate 12, which terminate in a plate 61 that joins the front edges of the walls. Between the walls 59 and 60 and extending frontward from the back plate 10 to the level of the inside surface of the plate 12 is mounted a support block 62. The slat 45 slides in the aperture formed by the front surface of block 62, the top surface of wall 59, the bottom surface of wall 60, and the back or inner surface of plate 61. The leftward motion of the slat 45 is terminated by the first or leftmost finger banging up against the right surface of the block 62.

The left end of the slat extends leftward from that portion of the slat which slides in the guideway 58. This leftmost end has a member 64 attached to its inward or back surface extending towards the back plate 10, and engages one end of an expansion spring 65 whose other end is pressed against the left side wall 18. The spring 65 urges the slat to the right or into its closed position. A pair of side walls 66 and 67 extending between the back and front plates 10 and 12 and between the wall 18, and the guideway 59; flank the spring 65 on its top and bottom sides to maintain the spring 65 in its proper position.

This leftmost end of the slat 45, has a gate control knob 70 mounted on its front surface which extends frontward away from the front plate 12. The knob is to be gripped by the person using the device and pushed to the left to open the gate. Specifically the knob moves the slat to the left against the force exerted by the spring 65, and the fingers attached to the slat move leftward away from their blocking position at the center of exits of the passages 24 permitting any balls in the passages 24 to roll downward into the area 27.

The undulatory passage 28 begins at the collection area 27 which is directly below the gate 26. The area 27 is defined at its top by the gate 26 and its right, left and bottom sides merge into the passage 28. The walls 71 and 72 define the passage 28. These walls are equally spaced apart from each other to permit a ball to roll between them. The walls undulate back and forth between the left side wall 18 and the J-shaped wall 32. The walls are long enough to provide a passage capable of holding 100 balls.

On the front plate directly frontward from the passage, there are 100 holes equally spaced from each other by the diameter of one ball. Each hole corresponds to the numerically ordered position of the balls lined up in the undulating passage. (Each hole is located just upwards from this ball's position.)

Each hole is doubly numbered; one number set begins with 1 in the lower right-hand corner and goes up to 100, and the other number set begins with 99 in the lower right-hand corner and descends to 0 on the 100 numbered hole.

Since each hole is located just upward from the corresponding ball, the numbers of the first set designate how many balls are below it in the passage when the passage is full.

The holes are adapted to receive pins 73 which extend into the undulatory passage and stop the balls from passing that hole position (FIG. 4). The purpose of the pegs will become apparent later.

The lower right-hand end of the undulatory passage terminates in the trigger mechanism. The trigger consists of a resilient slat of plastic 75. The left third of the slat 75 is mounted onto the outer surface of the bottom wall 15, and its right edge 76 extends slightly beyond the right side of the right wall 16. This right edge 76 is to be gripped by the player and pulled downward, flexing the plastic slat 75 as shown in phantom in FIG. 1. A block of plastic 78 which forms a hammer is secured to the top wall of the slat 75 and extends into the lower portion of the first passage 20 through an opening in the bottom wall 14. This opening is present only in the upper two-thirds of wall 14 (i.e.—closer to front plate 12), the lower third of wall 14 (i.e.—closer to back plate 10) preventing a ball in the passage 20 from rolling downward, and out of the passage when the slat is flexed downward. Mounted adjacent to the block 78 and coplanar with the wall 32 is a finger 79 which extends upward partially into the end of the undulatory passage. It will be noted that the bottom of the wall 32 does not extend below the upper wall 71 of the undulatory passage 28, and the finger 79 thus prevents the balls in the undulatory passage from entering the first passage. Also connected to the slat 75 is a plate 80 mounted on the front edge of the slat 75 frontwards from the front plate 12 and to the left of the first passage 20. The plate extends topwards over the "1" and "2" ball position of the undulatory passage 28. At a point beginning with wall 71, and the intersection of the "1" and "2" ball position is located the bottom corner of a semi-oval cross sectioned piece of plastic called an indexer 81 which extends inward from plate 80 towards the bottom plate 10. A hole (not shown in the drawing) is cut in the top plate 12 to permit the indexer 81 to travel arcuately when the slat 75 is flexed. The path of travel of the indexer is downward and rightward between the balls in the first and second positions. The bottom corner of the indexer 81 is sharp, and its middle portion is wider. As the slat 75 is flexed downward, the bottom corner of the indexer 81 moves between the balls in the first and second positions. The downward and rightward travel of the indexer and its bulging middle section now in contact with the ball, in the first position, pushes the ball to the right, out of the undulatory passage into the first passage 20. Simultaneously (because of the flexure of slat 75) the finger 79 has been pulled downward below the bottom wall 14 and allowing the ball to pass into the bottom end of the first passage 20. Only one ball has entered the passage 20 because the left side of the indexer is located in the undulatory passage below the second ball and in this position effectively stops the second ball from moving downward. When the slat 75 is released, it snaps back upward into position and the hammer 78 enters the bottom end of passage 20 and strikes the ball therein with sufficient force to project it through the first passage 20, and into the distribution area 22. With the slat upward in its at rest position, the ball in the "2" position rolls down into the "1" position and is stopped there by the finger 79, the other balls in the passage 28 roll down to the next position, and the process of shooting off the next ball is repeated.

The device may be used to perform and demonstrate arithmetic operations. A few of the manipulations will now be described.

*Division.*—For example, 12÷4. A peg is put into the #12 hole position on the front plate 12. The handle 40a associated with the first storage passage 24a is pushed upward, raising the slat 38a and the flange 39a which divides the distribution area 22 and guides any ball entering the area into the passage 24a. Balls are shot off until 4 are counted in the first storage passage 24a. Then the slat 38a and flange 39a are lowered by gripping handle 40a and sliding it downward, and slat 38b and flange 39b are raised by gripping handle 40b and sliding it upward to open the second storage passage 24b. More balls are shot off until 4 are counted in the second storage passage 24b. The second passage is then closed by sliding handle 40b down, and the third passage is open by sliding handle 40c up. More balls are shot off until there are 4 in storage passage 24c. There are now no more balls to be shot, it being remembered that the peg in the "12" position hole will permit only 12 balls to enter the passage 20 and be shot off. The operator now counts the number of storage passages which are filled, i.e., 3, and this is the answer; 12÷4=3. The operator sees that there are 3 groups of four balls each and that the 12 balls have been "divided" into three groups of four. This helps him picture, or feel the division process and aids in his learning.

To clear the machine, the peg is removed, the gate is opened and the balls roll down into the passage 28.

*Multiplication.*—For example, 3×2=? The first storage passage is opened by handle 40a. Three balls are shot off, to come to rest in the passage which is then closed. The second storage passage is opened by handle 40b and three more balls are shot off which come to rest in this passage. The student then looks at the inverse set of numbers on the front plate above the undulatory passage 28 and sees that the passage is filled below the "6" position which is the answer 3×2=6. To clear the machine, the gate 26 is opened and the balls roll down filling the passage 28.

*Addition.*—For example, 3+2=? A peg is put in the "3" position. All the balls are shot off. (It does not matter in which storage channel they come to rest.) The peg is then removed, and the balls roll down filling the end of passage 28. The peg is put in the "2" position. All the balls are shot off. The student removes the peg and the balls roll down in channel 28. The student may count 5 balls in the storage passage, and check his count by looking at the inverse set of numbers on the front plate 12 and noting that the passage is filled below the "5" position. The machine is cleared as above.

*Subtraction.*—For example, 7−2=? A peg is put in the "7" position and in the "2" position. All the balls (i.e., two) are shot off. The peg in the lower "2" position is removed, the balls roll down and the student notices that the hole numbered "5" is the last one with a ball. This, of course is the correct answer since 7−2=5.

Although one embodiment of the invention has been illustrated and described, various changes in the form and relative arrangements of the parts, which will now appear to those skilled in art may be made without departing from the scope of the invention.

What is claimed is:

1. A device adapted to be propped up at its top end comprising a bottom plate; a transparent top plate; plurality of balls between said plates; an external wall between said top and bottom plates, and curved along its top portion; a J-shaped wall parallel with the right and top portions of said external wall; said J-shaped wall being spaced inward from said external wall, and termination at the top left portion of the device; said two walls form a first passage for a ball to roll therein; a guide wall between said top and bottom plates, extending inwardly from said external wall below the top left end of the device to guide a ball emerging from the first passage to the right; a plurality of longitudinally extending walls mounted between said top and bottom plates, one group of said walls being equally spaced from each other forming the left wall of a plurality of storage passages, a second group being equally spaced from each other and spaced to the right of said first group of walls an amount sufficient to permit a ball to pass between adjacent walls of each group, said second group of walls forming the right wall of the plurality of storage passages, each wall of said second group being also spaced apart from the rightmost adjacent wall of the first group to provide a slot there between, each of said pairs of walls having the slots there between being of ordered height with the pair on the left longer than the pair on its right; a plurality of shafts slidably mounted in said slots; flanges mounted one on the upper end of each shaft and extending across the top opening of one adjacent storage passage; plurality of knobs, one on each shaft extending through said front plate to be gripped by an operator for sliding the shafts upwards and downward; said shafts when in the up position guide a ball emerging from the first passage into an adjacent storage passage; a gate resiliently mounted extending transversely across the device below the plurality of storage passages, said gate having a slat located frontward on said device above the height of balls, and a plurality of fingers attached to and extending inward from said slat; said fingers being spaced apart at equal amounts corresponding to the location of the storage passages to block said lower ends of said passage when the gate is in a first resiliently relaxed position; said fingers being of a size that there is sufficient space between adjacent fingers to permit a ball to pass there between; said gate including a knob attached to said slat, extending through said front to be gripped by an operator and operatively slid to a second position where said fingers are below said pairs of walls and the lower ends of the storage passages are unblocked; a pair of walls equally spaced from each other extending between said top and bottom plates, said pair of walls being spaced apart along their common length by an amount sufficient to permit a ball to pass there between, said pair of walls defining a second passage which undulates between said left side external wall and the J-shaped wall from an area below the gate to the lower end of the first passage; a plurality of holes formed in said top plate above the second passage; said holes being spaced apart from each other by the diameter of a ball and each hole corresponding to an ordered ball position in the second passage; a plurality of numbers marked on said front plate in order, and in correspondence to the ball positions adjacent to the holes; a trigger mechanism located in the bottom right corner of the device having a hammer resiliently mounted and capable for projecting a ball along said first passage, and at least one peg to be inserted into one of said holes to pass there through and into said second passage for blocking the balls from passing said location.

2. A device according to claim 1 said holes comprise 100, and said holes are numbered upward from 1 to 100, and downward from 99 to 0.

3. A device comprising a plurality of balls, a first passage extending along one side of the device and curved across the top of the device, a trigger mechanism located at the bottom of the first passage for projecting a plurality of balls through the passage one ball at a time, a distribution area beginning at the other end of the first passage and extending transversely and downwardly across the device, a plurality of longitudinally extending storage passages located below the distribution area, a plurality of deflectors associated with the storage passages, each of said deflectors adapted to be raised into said distribution area to guide a ball into the associated storage passage, each of said deflectors including a flange extending over the top of the associated storage passage, said flanges of the closed deflector forming the bottom wall of said distribution area, a gate interconnected with the storage passages for retaining the balls therein, and said gate being movable to release said balls from the storage passages into a collection area, a second passage undulating between one side wall of the device and an inside wall of the first passage, and open at its top to the collection area, and connected at its bottom to the first passage, and said second passage being calibrated to correspond to predetermined ball positions.

4. A device according to claim 3 wherein said calibration comprises a set of numbered holes, and further comprising at least one peg capable of being inserted into any one of said numbered holes in the second passage for blocking the balls from passing that location.

5. A device according to claim 3 wherein said calibration comprises a first set of numbers extending consecutively upward from the first ball position, and a second set of numbers extending consecutively downwardly from the first ball position.

References Cited by the Examiner

UNITED STATES PATENTS

| | | | |
|---|---|---|---|
| Re.13,025 | 10/1909 | Stern | 273—121 |
| 2,875,529 | 3/1959 | Cornelius | 35—32 |
| 3,127,686 | 4/1964 | Goldfarb | 35—31 |

FOREIGN PATENTS

| | | |
|---|---|---|
| 427,486 | 4/1935 | Great Britain. |
| 435,553 | 9/1935 | Great Britain. |

EUGENE R. CAPOZIO, *Primary Examiner.*

W. GRIEB, *Assistant Examiner.*